April 29, 1930.     G. McNEE     1,756,696
STOVEPIPE
Filed Dec. 2, 1927
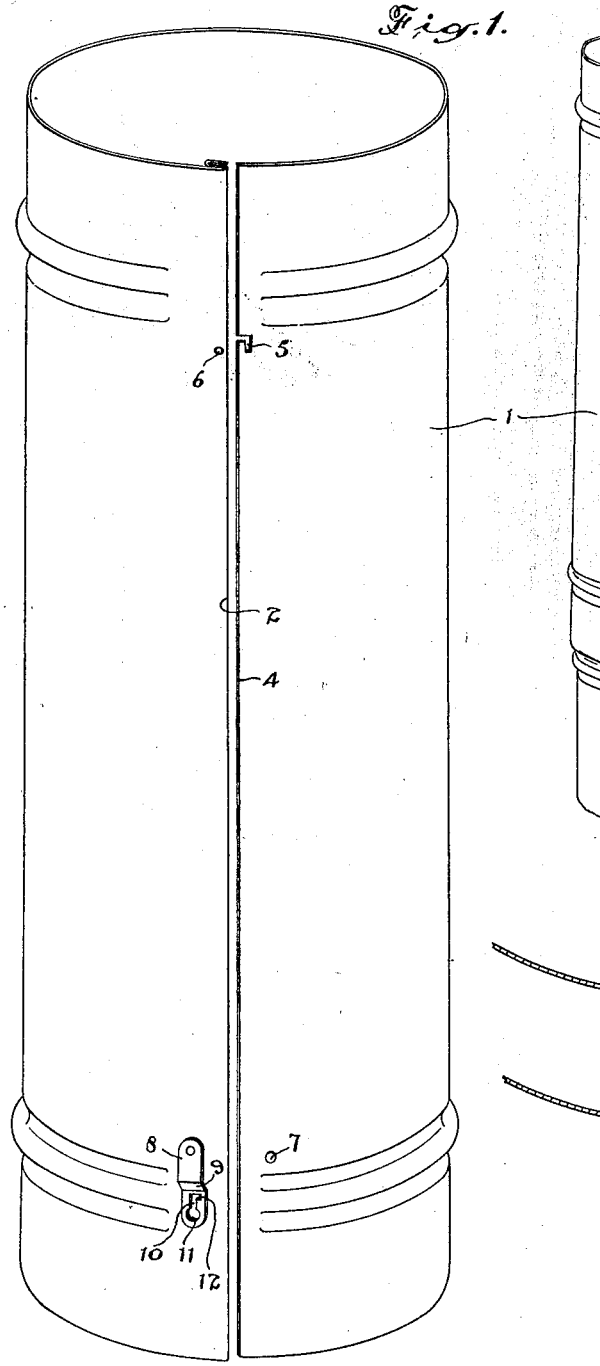
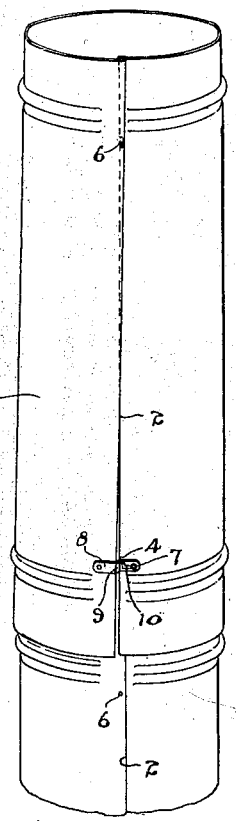
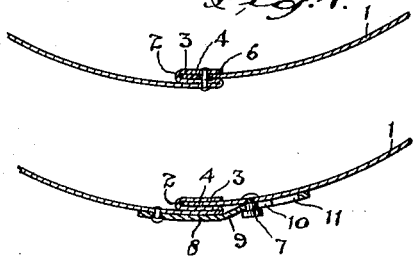
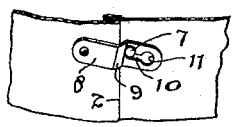
Inventor.
George McNee.

Patented Apr. 29, 1930

1,756,696

UNITED STATES PATENT OFFICE

GEORGE McNEE, OF BELWOOD, ONTARIO, CANADA

STOVEPIPE

Application filed December 2, 1927. Serial No. 237,315.

The objects of this invention are to devise an open joint stove pipe which may be conveniently nested for shipping purposes and which may be quickly and securely joined at the seam, the seam joint being capable of expansion at one end to facilitate the ready assembling or disconnecting of the several lengths.

The principal feature of the invention consists in the novel construction of the seam and locks whereby one end of the free edge of the sheet metal which is housed in a groove seam in the other edge of the sheet is secured in an interlock and the other end is secured by an adjustable latch which allows a limited expansion of one end of the pipe and is capable of being locked securely.

In the drawings, Figure 1 is a perspective view of a pipe length showing the seam slightly open and ready to be secured.

Figure 2 is a perspective view of the adjustable locking device for the large end of the pipe shown in the locked position.

Figure 3 is a perspective view on a smaller scale of a pipe length showing the top end locked and the bottom end secured in the expanded position.

Figure 4 is a section through the seam at the top end lock.

Figure 5 is a section through the seam at the bottom end lock.

In the present invention the metal sheet forming the stove pipe length 1 is shaped along one longitudinal edge with a return bead 2 of Z shape which provides an open groove 3 to receive the other longitudinal edge 4.

The preferred means for securing the upper end of the edge 4 in the groove 3 is by forming a bayonet slot 5 in the edge 4 and providing a rivet 6 extending across the groove 3 which slips into the bayonet slot and with a slight longitudinal movement locks the edge 4 in the groove.

At the lower or large end of the pipe I provide adjacent to one edge of the metal sheet a rivet 7 which extends outwardly and the head of which is spaced from the face of the sheet.

A latch member 8 is pivotally secured adjacent to the other edge of the sheet in transverse alignment with the rivet 7. This latch is formed of a strip of sheet metal and has a slight offset 9 to fit over the seam and the free end is formed with a bayonet-shaped keyhole slot 10 having the large end 11 adapted to slip over the head of the rivet 7 and the remainder slides freely on the rivet shank.

In joining up the pipe lengths the top or small ends are slipped together to lock the rivet 6 in the slot 5 as described. The edge 4 is fitted into the groove 3 throughout its length and the latch 8 is swung across the seam and the rivet head 7 is inserted in the end 11 of the latch slot. The flange of the head holds the latch in place but the seam joint is spread at the bottom sufficient to allow the pipe length to be easily inserted over the small end of another length. When the small end has been inserted the pipe is squeezed in and the latch slips along the shank of the rivet 7 and the upturned end 12 of the bayonet slot drops over the shank and locks the pipe securely in its finally closed position with the edge 4 of the pipe bottomed in the groove 3.

The arrangement described renders the joining and fitting of the pipes very simple and effective and when it is desired to take the pipes apart the bottom ends of the pipe lengths can be easily spread by lifting upwardly on the latch members to free the rivet from the end 12 of the latch slot.

The structure is very simple but extremely effective and the joint is also very cheaply constructed thus providing a very desirable article.

What I claim as my invention is:—

1. In a stove pipe the combination with a pipe length having a longitudinal groove formed in one edge adapted to receive the other edge, and means for locking the inserted edge in said groove at one end, of a rivet secured at the other end of the pipe adjacent to one edge, and a latch arm pivoted at one end adjacent the other edge of the pipe and having a slot extending radially from its pivot adapted to slidably receive said rivet and having a laterally extending notch at one end to lock with the rivet to secure the pipe in the closed position.

2. A stove pipe having a longitudinal groove formed in one edge adapted to receive the other edge, a rivet extending across said groove adjacent to one end, a bayonet slot in the edge to be inserted in said groove adapted to receive said rivet, said bayonet slot opening inwardly from the edge at a point offset from the rivet, a pivotal latch secured on the outside of the pipe at the end farthest from the aforesaid rivet and bayonet slot, and a rivet adapted to detachably engage said latch.

3. In a stove pipe the combination with a pipe length having a longitudinal groove formed in one edge adapted to receive the other edge, and means for locking the inserted edge in said groove at one end, of a rivet secured at the other end of the pipe adjacent to one edge and having an enlarged head spaced from the surface of the pipe, and a latch arm pivoted at one end adjacent the other edge of the pipe and having a slot therein extending radially from the latch pivot, said slot being enlarged at one end to permit the passage of the enlarged head of said rivet therethrough and having a lateral notch in the other end to receive the shank of said rivet in locking engagement.

GEORGE McNEE.